(12) United States Patent
Granhed et al.

(10) Patent No.: US 11,280,895 B2
(45) Date of Patent: Mar. 22, 2022

(54) HARMONIC RADAR REFLECTOR

(71) Applicant: Recco Invest AB, Lidingö (SE)

(72) Inventors: Magnus Granhed, Lidingö (SE); Tomas Forssén, Västerås (SE)

(73) Assignee: Recco Invest AB, Lidingö (SE)

( * ) Notice: Subject to any disclaimer, the term of this patent is extended or adjusted under 35 U.S.C. 154(b) by 0 days.

(21) Appl. No.: 16/620,963

(22) PCT Filed: Jun. 26, 2018

(86) PCT No.: PCT/SE2018/050687
§ 371 (c)(1),
(2) Date: Dec. 10, 2019

(87) PCT Pub. No.: WO2019/004911
PCT Pub. Date: Jan. 3, 2019

(65) Prior Publication Data
US 2020/0110168 A1    Apr. 9, 2020

(30) Foreign Application Priority Data
Jun. 29, 2017   (SE) .................................. 1750854-0

(51) Int. Cl.
*G01S 13/75* (2006.01)
*G01S 19/19* (2010.01)
*G01S 13/00* (2006.01)

(52) U.S. Cl.
CPC ............. *G01S 13/758* (2013.01); *G01S 19/19* (2013.01)

(58) Field of Classification Search
CPC .. G08B 13/2422; G01S 13/753; G01S 13/756
See application file for complete search history.

(56) References Cited

U.S. PATENT DOCUMENTS 4,001,822 A * 1/1977 Sterzer .................. G01S 13/756
  342/44
4,015,259 A * 3/1977 Siverhus ............... G01S 13/756
  342/44

(Continued)

FOREIGN PATENT DOCUMENTS

EP    1542371 A1 *  3/2004  ............... H04B 1/59
EP    2741424 A1    6/2014

(Continued)

OTHER PUBLICATIONS

G. L. Charvat et al., "Harmonic radar tag measurement and characterization", IEEE Antennas and Propagation Society International Symposium, Digest., Held in conjunction with: USNC/CNC/URSI North American Radio Sci. Meeting (Cat. No. 03CH37450), Columbus, OH, 2003, pp. 696-699 vol. 2.

(Continued)

*Primary Examiner* — Bernarr E Gregory
(74) *Attorney, Agent, or Firm* — Capitol City TechLaw

(57) ABSTRACT

A harmonic reflector circuit comprising an antenna connected to a non-linear circuit via a matching circuit, wherein the harmonic reflector circuit is configured to receive a signal at a receive frequency (fRX), and configured to transmit said received signal at a transmit frequency (fTX), where the transmit frequency is a multiple of the receive frequency, the harmonic reflector circuit wherein the receive frequency (fRX) is in an interval from a first frequency to a second frequency, where the first frequency is at least 800 MHz; and the second frequency is at least 34 MHz larger than the first frequency; the received signal is transmitted at the transmit frequency (fTX) with an output power (Pout) of at least 70% of the maximum available output power (Pmax).

7 Claims, 2 Drawing Sheets

(56) References Cited

U.S. PATENT DOCUMENTS

| | | | | |
|---|---|---|---|---|
| 4,019,181 A | * | 4/1977 | Olsson | G01S 13/758 |
| | | | | 342/42 |
| 4,302,846 A | * | 11/1981 | Stephen | G08B 13/2422 |
| | | | | 340/572.2 |
| 4,331,957 A | | 5/1982 | Enander et al. | |
| 5,119,099 A | * | 6/1992 | Haruyama | G01S 13/758 |
| | | | | 342/51 |
| 2013/0130843 A1 | | 5/2013 | Burroughs et al. | |

FOREIGN PATENT DOCUMENTS

| | | |
|---|---|---|
| WO | 00/48019 | 8/2000 |
| WO | 2010144011 A1 | 12/2010 |

OTHER PUBLICATIONS

Ibrahim T. Nassar et al., "A Compact 3-D Harmonic Repeater for Passive Wireless Sensing," IEEE Transactions on Microwave Theory and Techniques, Plenum, USA, vol. 60, No. 10, Oct. 1, 2012, pp. 3309-3316.

Kimmo Rasilainen et al., "On Design and Evaluation of Harmonic Transponders," IEEE Transactions on Antennas and Propogation, IEEE Sevice Center, Piscataway, NJ, US, vol. 63, No. 1, Jan. 1, 2015, pp. 15-23.

Kimmo Rasilainen et al., "Effect of Shape and Surrounding on Harmonic Transponder Performance," 2016 10th European Conference on Antennas and Propagation (EUCAP), European Associations of Antennas and Propagation, Apr. 10, 2016, pp. 1-5.

* cited by examiner

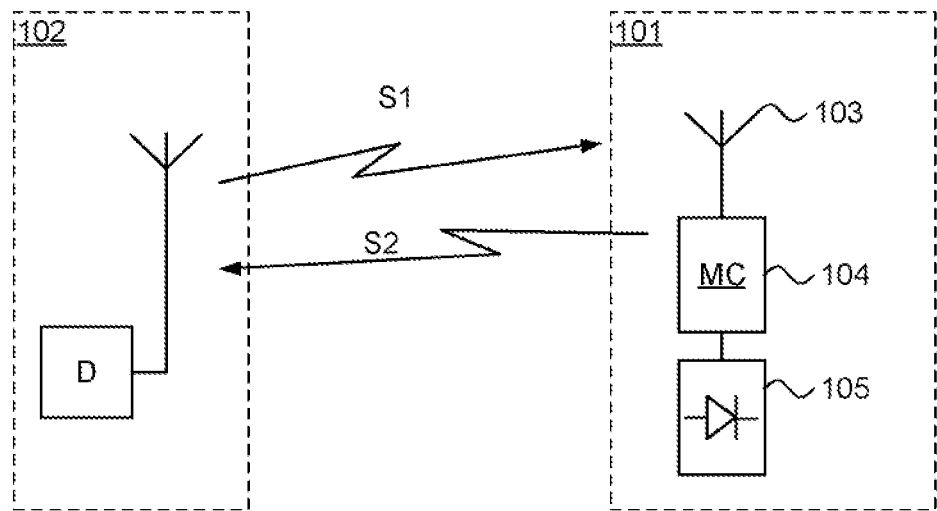
FIG. 1
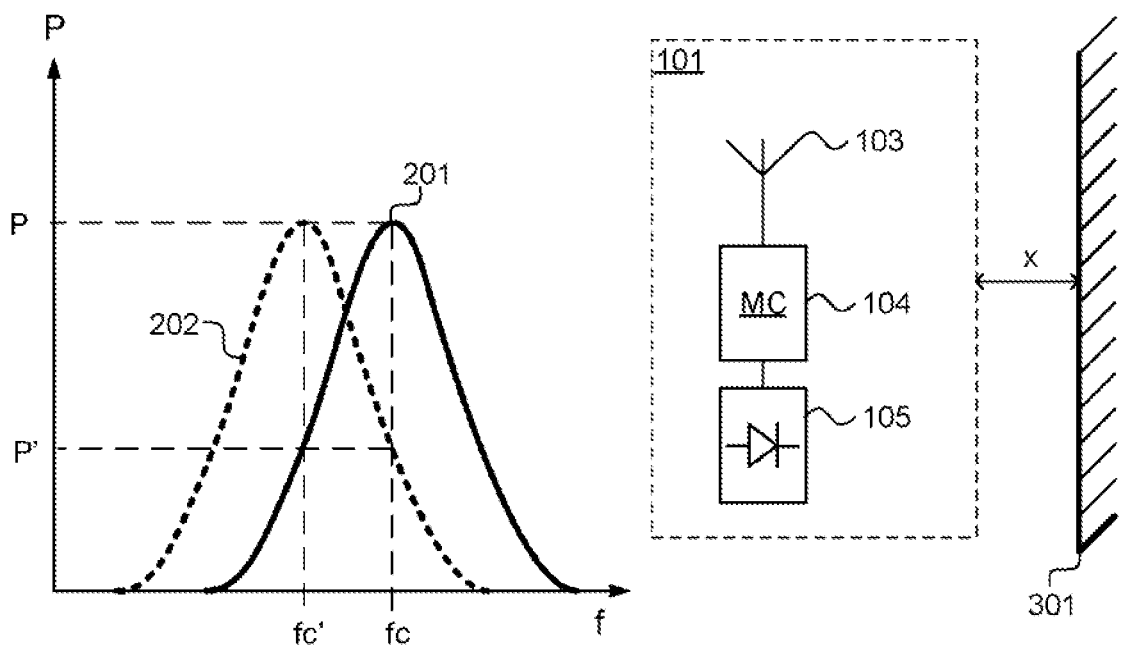
FIG. 2 (Prior-Art)
FIG. 3 (Prior-Art)

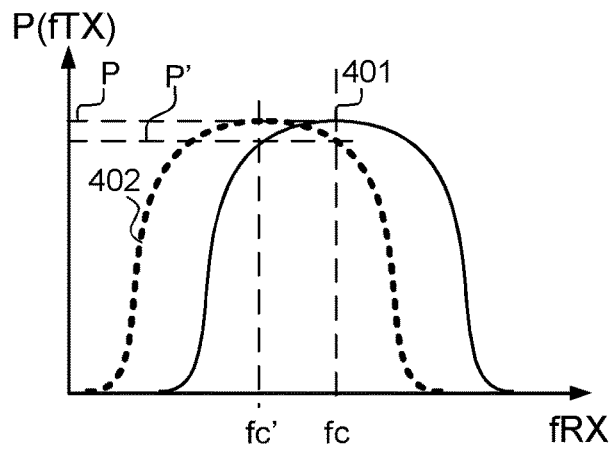
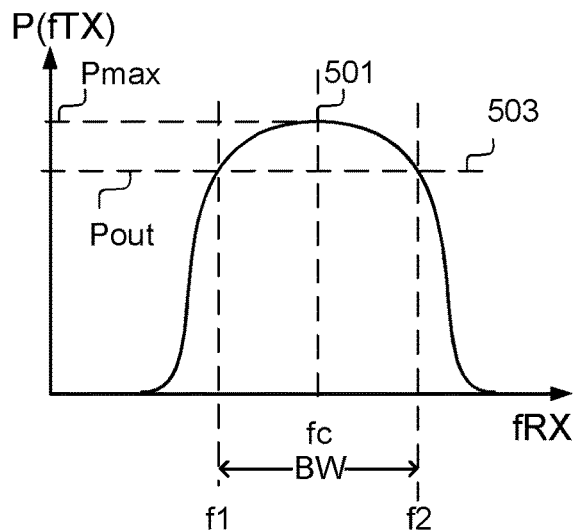
FIG. 4    FIG. 5
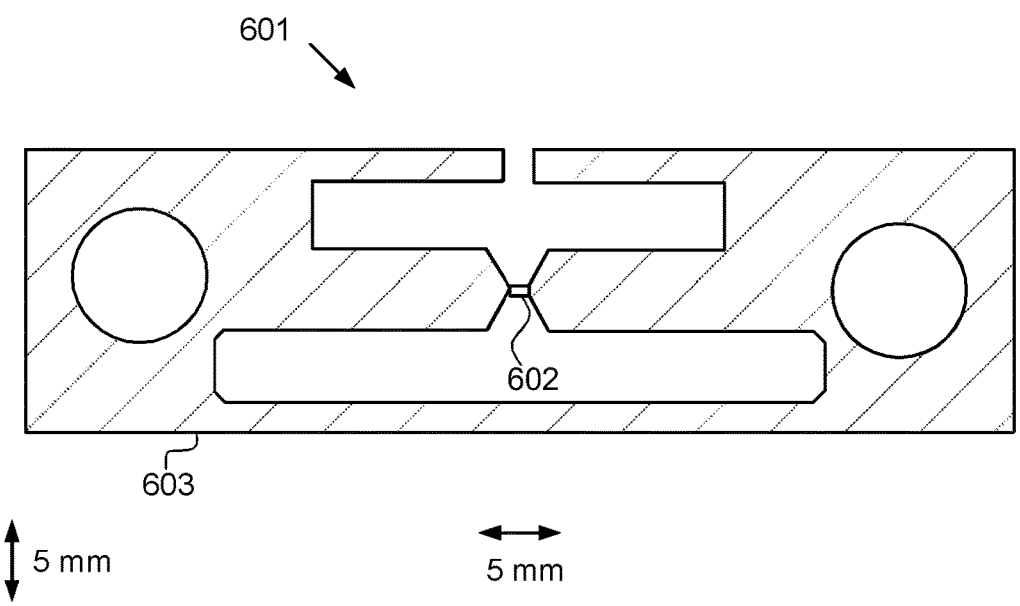
FIG. 6

HARMONIC RADAR REFLECTOR

This application claims priority under 35 USC 119(a)-(d) from SE patent application No. 1750854-0 filed Jun. 29, 2017, the entire content of which is incorporated herein by reference.

TECHNICAL FIELD

The present invention relates to a radar reflector, and particularly to a radar reflector for harmonic radar.

BACKGROUND

Harmonic radars have been used for a long time in search and rescue operations throughout the world. In a typical avalanche scenario a skier is lost in an avalanche and a rescue team arrives shortly thereafter, the skier is equipped with a reflector. The rescue team is equipped with a detector that transmits a signal with a transmit frequency when the reflector on the skier receives this signal the reflector converts the frequency of the signal to a multiple thereof and transmits the signal. This means that the detector transmits on a first frequency and receives on a multiple of the first frequency, this information is then used to determine the position of the skier.

However, the tuning of the reflector involves tuning the antenna for receiving on the first frequency and transmitting on a multiple of the first frequency. Furthermore, a conventional reflector uses a non-linear element such as a diode for resonance and the antenna needs to be matched to this element in order to provide output power from the reflector. An example of a harmonic reflector is provided in U.S. Pat. No. 6,456,228B1. This patent provides a guideline for matching of the components of a harmonic reflector by means of transmission line sections.

Another example is disclosed in K. Rasilainen, J. Ilvonen and V. Viikari, "Antenna Matching at Harmonic Frequencies to Complex Load Impedance," in IEEE Antennas and Wireless Propagation Letters, vol. 14, no., pp. 535-538, 2015. doi: 10.1109/LAWP.2014.2370760.

According to prior art, such as disclosed above, the skilled person is mainly focused on providing a good efficiency in terms of reflected power at a single frequency.

If a conventional reflector is placed on objects with different properties a compromise must be made in order to minimize the impact of the object on the reflector. The conventional reflector is designed for a typical electromagnetic surrounding of the object. Therefore, a conventional reflector is designed to be mounted on objects with similar properties such as ski-boots or ski-helmets.

According to prior-art, such as EP1035418B1, the antenna is encapsulated in a dielectric, which solves the problem if a reflector is mounted inside a ski-boot or attached to the outside of the ski-boot.

However, the known solutions exhibit problems related to detection of objects with large differences in size and properties, due to the objects electromagnetic interaction with the reflector.

The present invention aims at solving that problem.

SUMMARY OF THE INVENTION

The above-mentioned problem is solved by means of a harmonic radar reflector which reflects an incoming signal at a receive frequency at a transmit frequency being a multiple of the receive frequency, wherein the harmonic radar reflector is designed for a broadband response.

Prior-art harmonic reflectors provide narrow band response, this is due to the fact that prior-art harmonic reflectors are mainly tuned to minimize return-loss at the specific receive frequency which means that a large amount of incoming energy to the harmonic radar is transferred to the non-linear element. The harmonic reflector may be tuned for a narrow band response; this further implies that the prior-art harmonic reflector is sensitive for electromagnetic interaction with the object it is attached to.

Prior-art harmonic reflectors are designed to maximize performance for a single constant environment. When the reflector is placed in an environment with different properties the performance will be degrade. This is mainly due to that the change in the electromagnetic properties result in different antenna impedance, resulting in a poor impedance match between the reflector antenna and the non-linear element.

The present invention provides a harmonic reflector circuit comprising an antenna connected to a non-linear circuit via a matching circuit, wherein the harmonic reflector circuit is configured to receive a signal at a receive frequency (fRX), and configured to re-transmit said received signal at a transmit frequency (fTX), where the transmit frequency is a multiple of the receive frequency, wherein the receive frequency (fRX) is in an interval from a first frequency to a second frequency, where: the first frequency is at least 800 MHz; and the second frequency is at least 34 MHz higher than the first frequency; the received signal is transmitted at the transmit frequency (fTX) with an output power (Pout) of at least 70% of the maximum available output power (Pmax) for a frequency in the transmit frequency range from the multiple of the first frequency to the same multiple of the second frequency. This allows detection of objects with large differences in material and size, due to the broadband behaviour of the harmonic reflector circuit.

According to an aspect, the first frequency is 860.5 MHz and the second frequency is 909.5 MHz.

According to an aspect, the transmit frequency fTX is the double receive frequency fRX.

According to an aspect, the harmonic reflector comprises a flexible substrate with a metal film.

According to an aspect, the antenna and parts of the matching circuit are formed in the metal film.

According to an aspect, the harmonic reflector comprises a diode as the non-linear element.

Further features and advantages of the present invention will be presented in the following detailed description of exemplifying embodiments of the invention with reference to the annexed drawing.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 is a schematic drawing of a detector and a harmonic reflector circuit.

FIG. 2 is a graph illustrating the reflected power from a prior-art harmonic reflector, FIG. 3 is a schematic drawing of a prior-art harmonic reflector circuit interacting with the object it is attached to.

FIG. 4 is a schematic drawing of a harmonic reflector circuit according to an embodiment of the present invention together with a detector.

FIG. 5 is a graph illustrating the response provided by the harmonic reflector according to an embodiment of the present invention, and FIG. 6 is an embodiment of a harmonic reflector circuit according to an embodiment of the present invention.

DETAILED DESCRIPTION OF EXEMPLIFYING EMBODIMENTS

FIG. 1 shows a harmonic reflector circuit, generally designated 101, and a detector, generally designated 102.

The detector 102 transmits a signal S1 at a frequency fRX, this signal S1 is received by the harmonic reflector circuit 101 and converted and transmitted as a second signal S2 at a frequency fTX by the harmonic reflector circuit 101. The harmonic reflector circuit 101 receives the incoming signal S1 by means of an antenna 103. The antenna 103 is connected to a matching circuit 104 which provides an impedance match between the antenna 103 and the non-linear circuit 105 for both the frequency fRX and the frequency fTX. The impedance matching is crucial for a conversion with low losses from the first signal S1 to the second signal S2, at their frequency fRX and fTX, respectively.

In FIG. 2 a typical response from the harmonic reflector 102 is disclosed. A first curve 201 shows the reflected power P from a signal transmitted at frequency fc, the bandwidth of the curve 201 depends on the impedance matching between the non-linear circuit 105 and the antenna 103, and of course the bandwidth of the antenna 103 and the non-linear circuit 105, themselves.

In FIG. 3 the harmonic reflector circuit 101 is shown together with a ground plane 301. The ground plane 301 may be a physical object, such as a car or a human. The ground plane 301 causes a dielectric coupling to the harmonic reflector circuit 101 which changes the properties of the matching circuit 104. This means that the reflected power at frequency fc decreases from P to P' on corresponding curve 202. In a prior-art harmonic reflector circuit 101 the matching circuit is configured to provide matching for a predetermined ground plane at a predetermined distance and a predetermined dielectric environment. For example the harmonic reflector circuit 101 is dimensioned for mounting on a ski boot or a helmet i.e. ground planes of the same order of magnitude and similar dielectric properties. This means that a conventional harmonic reflector circuit 101 mounted on a pair of glasses or mounted on a container will provide very different responses in terms of reflected power P, partly due to the large differences of the ground planes and dielectric properties of the surroundings.

The present inventors have realized that the problem of varying properties of the ground plane and dielectric properties are main contributors related to the problem of detecting harmonic radar reflections from objects of various properties.

The present inventors have realized that a solution to the above problem related to harmonic radar reflections from objects of varying properties, is provided by increasing the bandwidth of the harmonic reflector circuit 101. This can be understood by studying FIG. 4 in which the reflected harmonic power P is shown as a function of frequency f. The first curve 401 illustrates the reflected harmonic power around the center frequency fc, this first curve provides a larger bandwidth compared to the prior-art curve 201.

Assume that a ground plane 301 is placed such that the capacitive coupling from the ground plane to the harmonic reflector circuit 101 causes a shift of the first curve 401 to a second curve 402 with a center frequency fc'. The y-axis of FIG. 4 discloses the reflected power at a multiple of the frequency fRX, which is the frequency fTX. The x-axis shows the receive frequency fRX. The reflected power P decreases to P', which is much less than the decrease shown in FIG. 2. This means that the reflected power P is not significantly affected by the ground plane 301.

In FIG. 5 the reflected power P at the transmit frequency fTX is shown as a function of the receive frequency fRX from a harmonic reflector circuit 101 according to the present invention. The receive frequency (fRX) is in an interval from a first frequency f1 to a second frequency f2, where the first frequency f1 is at least 800 MHz. The second frequency f2 is at least 34 MHz larger than the first frequency. The received signal is transmitted at the transmit frequency (fTX) with an output power (Pout) of at least 70% of the maximum available output power (Pmax) for a defined electromagnetic environment.

In one embodiment, the first frequency is 860.5 MHz and the second frequency is 909.5 MHz.

In FIG. 6 an embodiment of a harmonic reflector circuit, generally designated 601, is drawn to scale in a top view. This harmonic reflector circuit 601 comprises a non-linear circuit which in this embodiment is a surface mounted diode 602 soldered to a metal film 603 of a substrate. The antenna and the matching circuit are integrally formed in the metal film 603 of the substrate. The harmonic reflector circuit 601 is drawn to scale, which means that by measuring and scaling the drawing a broadband harmonic reflector circuit 601 is achieved.

The invention claimed is:

1. A harmonic reflector circuit comprising:
an antenna connected to a non-linear circuit via a matching circuit;
wherein the harmonic reflector circuit is configured to receive a signal at a receive frequency (fRX), and configured to re-transmit the received signal at a transmit frequency (fTX);
wherein the transmit frequency is a multiple of the receive frequency; and
wherein the receive frequency (fRX) is in an interval from a first frequency to a second frequency, where:
the first frequency is at least 800 MHz;
the second frequency is at least 34 MHz higher than the first frequency; and
the received signal is re-transmitted at the transmit frequency (fTX) with an output power (Pout) of at least 70% of a maximum available output power (Pmax).

2. A harmonic reflector circuit according to claim 1, wherein the first frequency is 860.5 MHz and the second frequency is 909.5 MHz.

3. A harmonic reflector circuit according to claim 1, wherein the maximum available output power (Pmax) is at least 0.1% of an incoming radiated power at the antenna.

4. A harmonic reflector circuit according to claim 1, wherein the transmit frequency is double the receive frequency.

5. A harmonic reflector circuit according to claim 1, comprising a substrate with a metal film.

6. A harmonic reflector circuit according to claim 5, wherein the antenna and parts of the matching circuit are formed in the metal film.

7. A harmonic reflector circuit according to claim 5, wherein the non-linear circuit is a diode.

* * * * *